US011032445B2

(12) United States Patent
Nakagawa

(10) Patent No.: US 11,032,445 B2
(45) Date of Patent: Jun. 8, 2021

(54) INFORMATION PROCESSING APPARATUS AND SYSTEM AND NON-TRANSITORY COMPUTER READABLE MEDIUM

(71) Applicant: FUJI XEROX CO., LTD., Tokyo (JP)

(72) Inventor: Tomoka Nakagawa, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 126 days.

(21) Appl. No.: 16/002,661

(22) Filed: Jun. 7, 2018

(65) Prior Publication Data
US 2018/0376029 A1 Dec. 27, 2018

(30) Foreign Application Priority Data

Jun. 21, 2017 (JP) .............................. JP2017-121517

(51) Int. Cl.
G06F 3/12 (2006.01)
H04N 1/44 (2006.01)
H04N 1/00 (2006.01)
H04L 29/06 (2006.01)

(52) U.S. Cl.
CPC ......... H04N 1/4433 (2013.01); G06F 3/1222 (2013.01); G06F 3/1238 (2013.01); G06F 3/1253 (2013.01); G06F 3/1292 (2013.01); H04L 63/083 (2013.01); H04L 63/10 (2013.01); H04N 1/00411 (2013.01); H04N 1/00511 (2013.01); H04N 1/00514 (2013.01); G06F 3/1219 (2013.01)

(58) Field of Classification Search
CPC .... G06F 3/1222; G06F 3/1219; G06F 3/1253; G06F 3/1292; G06F 3/1238; H04N 1/00411; H04N 1/00511; H04N 1/00514; H04N 1/4433; H04L 63/083; H04L 63/10
USPC ....................................................... 358/1.13
See application file for complete search history.

(56) References Cited

U.S. PATENT DOCUMENTS 9,866,711 B2 * 1/2018 Iwashima ............. G06F 3/1205
2020/0019355 A1 * 1/2020 Kimura ................ G06F 3/1238

FOREIGN PATENT DOCUMENTS

JP 2004-192625 A 7/2004
JP 2012-194618 A 10/2012
JP 2013-162299 A 8/2013
(Continued)

OTHER PUBLICATIONS

Apr. 6, 2021 Office Action issued in Japanese Patent Application No. 2017-121517.

Primary Examiner — Dov Popovici
(74) Attorney, Agent, or Firm — Oliff PLC

(57) ABSTRACT

An information processing apparatus includes an instructing unit, a response obtaining unit, and an execution unit. The instructing unit provides an instruction to display an approval request screen to a terminal apparatus operated by a second user. The approval request screen is used for making a request to approve execution of setting changing processing for changing a setting of the information processing apparatus operated by a first user. The first and second users are authenticated by an authenticating unit. The response obtaining unit obtains a response made on the approval request screen from the second user. The execution unit executes the setting changing processing in accordance with the response obtained by the response obtaining unit.

11 Claims, 10 Drawing Sheets

(56) References Cited

FOREIGN PATENT DOCUMENTS

| JP | 2017-034425 A | 2/2017 |
|---|---|---|
| JP | 2017-107412 A | 6/2017 |

\* cited by examiner

INFORMATION PROCESSING APPARATUS AND SYSTEM AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-121517 filed Jun. 21, 2017.

BACKGROUND

Technical Field

The present invention relates to an information processing apparatus and system and a non-transitory computer readable medium.

SUMMARY

According to an aspect of the invention, there is provided an information processing apparatus including an instructing unit, a response obtaining unit, and an execution unit. The instructing unit provides an instruction to display an approval request screen to an apparatus operated by a second user. The approval request screen is used for making a request to approve execution of setting changing processing for changing a setting of the information processing apparatus operated by a first user. The first and second users are authenticated by an authenticating unit. The response obtaining unit obtains a response made on the approval request screen from the second user. The execution unit executes the setting changing processing in accordance with the response obtained by the response obtaining unit.

BRIEF DESCRIPTION OF THE DRAWINGS

An exemplary embodiment of the present invention will be described in detail based on the following figures, wherein.

DETAILED DESCRIPTION (Overview of Configuration)

Figure 1:
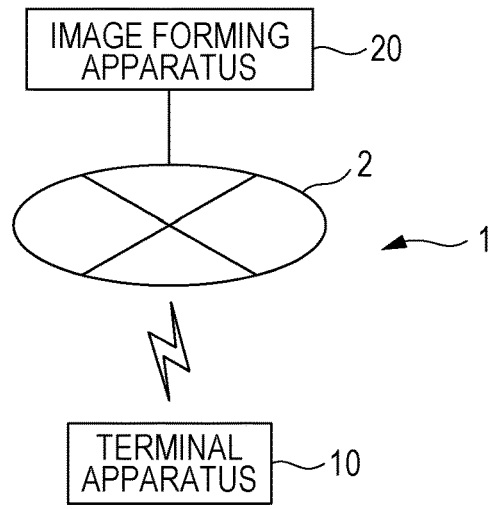
FIG. 1 illustrates an information processing system according to an exemplary embodiment of the invention.

FIG. 1 illustrates an information processing system 1 according to an exemplary embodiment of the invention. A communication network 2 is used for performing data communication. Plural computers are connected to the communication network 2 to perform data communication. The communication network 2 includes a wired local area network (LAN) and a wireless LAN, for example.

An image forming apparatus 20, which is an example of an information processing apparatus according to an exemplary embodiment of the invention, has an image forming function of forming an image on a sheet, a scan function of reading a document, a copy function, a fax sending-and-receiving function, a photo-taking function, and so on. The image forming apparatus 20, which is connected to the communication network 2, is connected to another computer to perform data communication via the communication network 2.

A terminal apparatus 10, which is an example of a terminal apparatus according to an exemplary embodiment of the invention, is a smartphone in this exemplary embodiment and performs data communication. The terminal apparatus 10 connects to the communication network 2 by accessing an access point of the wireless LAN included in the communication network 2, and performs data communication via the communication network 2. In this exemplary embodiment, plural terminal apparatuses 10 may connectable to the communication network 2. For simple representation, however, only one terminal apparatus 10 is shown in FIG. 1. The terminal apparatus 10 is not restricted to a smartphone, and may be a tablet terminal, a desktop personal computer (PC), or a laptop PC.

In the information processing system 1, the terminal apparatus 10 and the image forming apparatus 20 communicate with each other via the communication network 2. An operation screen and a settings screen are displayed on the terminal apparatus 10, and a user manipulates these screens to operate the image forming apparatus 20 and to set settings of the image forming apparatus 20.

(Hardware Configuration of Terminal Apparatus 10)

Figure 2:
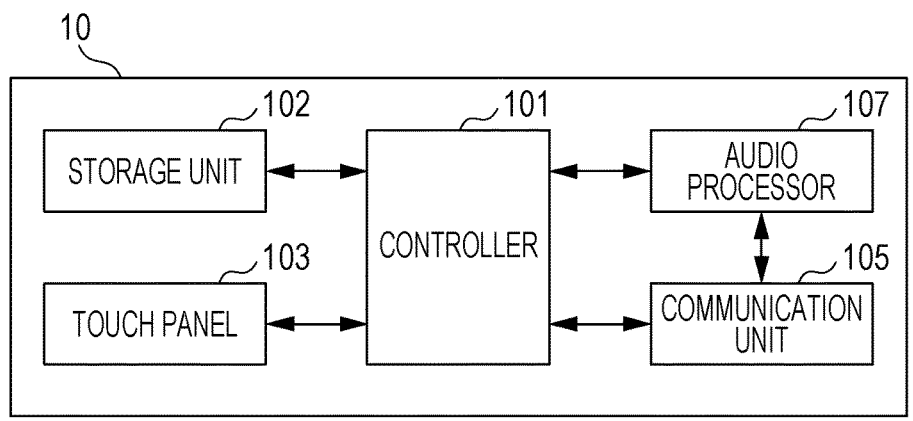
FIG. 2 is a block diagram illustrating an example of the hardware configuration of a terminal apparatus.

FIG. 2 is a block diagram illustrating an example of the hardware configuration of the terminal apparatus 10. A touch panel 103 is a combination of a liquid crystal display and a sensor, which detects that a finger touches the display surface of the liquid crystal display. The touch panel 103 displays characters, a graphical user interface (GUI), and so on. The touch panel 103 also detects the position of the display surface at which a finger touches by using the sensor.

A communication unit 105 serves as a communication interface which performs communication via the communication network 2. The communication unit 105 also serves as a communication interface which performs voice communication and data communication via a mobile communication network.

An audio processor 107 includes a microphone and a speaker. When performing voice communication in the terminal apparatus 10, the audio processor 107 receives a digital signal indicating the voice of a communication party from the communication unit 105 and then converts the received digital signal into an analog signal. The analog signal is then supplied to the speaker, and the voice of the communication party is output from the speaker. When the microphone collects voice of a user, the audio processor 107 converts the collected voice into a digital signal. When performing voice communication in the terminal apparatus 10, the audio processor 107 supplies this digital signal to the communication unit 105. The digital signal is then sent from the communication unit 105 to a mobile communication network and further to a terminal apparatus 10 of the communication party.

A storage unit 102 includes a non-volatile memory which permanently stores data. The storage unit 102 stores a program of a known operating system (OS) to be installed in the smartphone, application programs, and files used by various programs. The storage unit 102 also stores special purpose applications for operating the image forming apparatus 20 and setting settings of the image forming apparatus 20 and various items of information used by the special purpose applications.

A controller 101 includes a central processing unit (CPU) and a random access memory (RAM), and executes the OS program and application programs. The controller 101 executing a program specifies a user operation in accordance with the position touched by a user and detected by the touch panel 103 and the screen displayed on the touch panel 103, and controls the individual elements and executes corresponding processing in accordance with the specified user operation.

(Functional Configuration of Terminal Apparatus 10)

Figure 3:
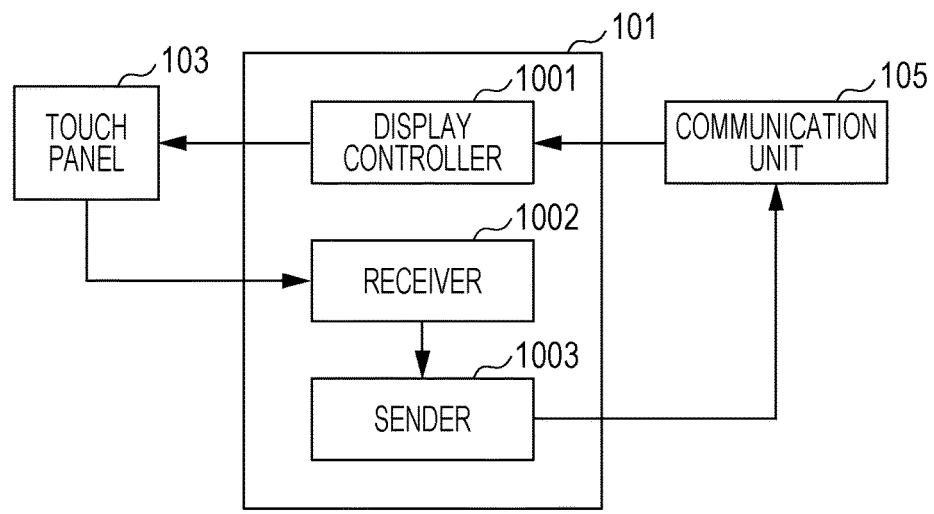
FIG. 3 is a functional block diagram illustrating an example of the functional configuration of the terminal apparatus.

FIG. 3 is a functional block diagram illustrating an example of the functional configuration of the terminal apparatus 10. The functions shown in FIG. 3 are those only related to an exemplary embodiment of the invention among the functions of the terminal apparatus 10 implemented by executing special purpose applications.

A display controller 1001, which is an example of a display according to an exemplary embodiment of the invention, controls the touch panel 103 so that an approval request screen for making a request to approve the execution of a job will be displayed on the touch panel 103 in accordance with an instruction from the image forming apparatus 20.

A receiver 1002, which is an example of a receiver according to an exemplary embodiment of the invention, receives a response from a user performing an operation on the approval request screen displayed on the touch panel 103.

A sender 1003, which is an example of a sender according to an exemplary embodiment of the invention, sends a response from a user received by the receiver 1002 to the image forming apparatus 20.

(Configuration of Image Forming Apparatus 20)

Figure 4:
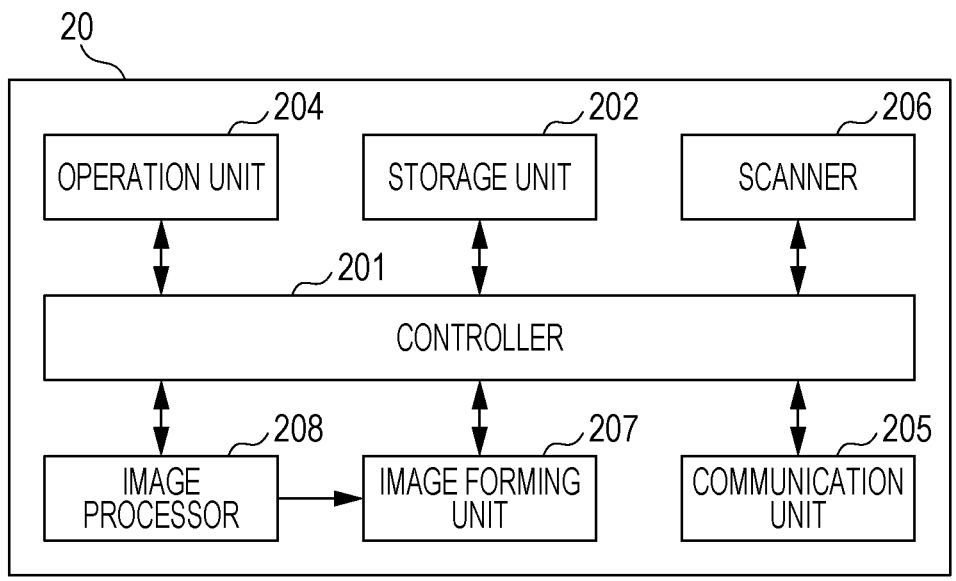
FIG. 4 illustrates an example of the hardware configuration of an image forming apparatus.

FIG. 4 is a block diagram illustrating an example of the hardware configuration of the image forming apparatus 20. An operation unit 204 includes plural buttons for operating the image forming apparatus 20. The operation unit 204 also includes a touch panel, which is a combination of a liquid crystal display and a sensor detecting that a finger touches the display surface of the liquid crystal display. The touch panel displays a GUI screen for operating the image forming apparatus 20. In this exemplary embodiment, the image forming apparatus 20 includes a touch panel and is operated by using the touch panel and buttons. The image forming apparatus 20 may include a liquid crystal display instead of the touch panel, and may display a GUI screen on the liquid crystal display and be operated by using buttons.

A communication unit 205 is connected to the communication network 2 via a wired or wireless medium and performs data communication with another apparatus connected to the communication network 2.

A scanner 206 includes an image reader (not shown) which optically reads a document and which generates an image file indicating the image of the read document. An image processor 208 performs various operations on image data indicating an image to be formed on a sheet. More specifically, the image processor 208 performs image processing, such as color correction and tone correction, on an image indicated by image data supplied from the controller 201, generates items of image data indicating images of yellow (Y), magenta (M), cyan (C), and black (K) from the image subjected to image processing, and then outputs the items of image data to an image forming unit 207.

The image forming unit 207 forms toner images on a sheet according to an electrophotographic system. This will be explained more specifically. The image forming unit 207 includes a Y image forming portion for forming Y toner images, an M image forming portion for forming M toner images, a C image forming portion for forming C toner images, and a B image forming portion for forming B toner images. The image forming portions form electrostatic latent images on respective photoconductors in accordance with the items of image data output from the image processor 208, and then attach toners to the surfaces of the photoconductors so as to form Y, M, C, and B toner images. The image forming portions then transfer these toner images on a sheet. Heat and pressure are applied to the toner images so that the toner images can be fixed. Then, the sheet on which the toner images are formed is discharged to the outside the image forming apparatus 20. Although in this exemplary embodiment the image forming unit 207 forms an image on a sheet by using toner, it may form an image by using ink according to an inkjet method, for example.

A storage unit 202, which is an example of a memory according to an exemplary embodiment of the invention, includes a storage device which permanently stores data. The storage unit 202 stores document files and image files sent from another apparatus and received by the communication unit 205 and image files generated by the scanner 206. The storage unit 202 also stores user IDs and passwords of users allowed to use the image forming apparatus 20. The image forming apparatus 20 verifies a user ID and a password input by a user against those stored in the storage unit 202. If the user ID and the password input by the user are stored in the storage unit 202, the user is allowed to log in the image forming apparatus 20 and is ready to use it. The storage unit 202 also stores information concerning the settings of the image forming apparatus 20 set by the user.

A controller 201 includes a CPU, a RAM, and a non-volatile memory, and executes the OS program and application programs stored in the non-volatile memory.

Figure 5:
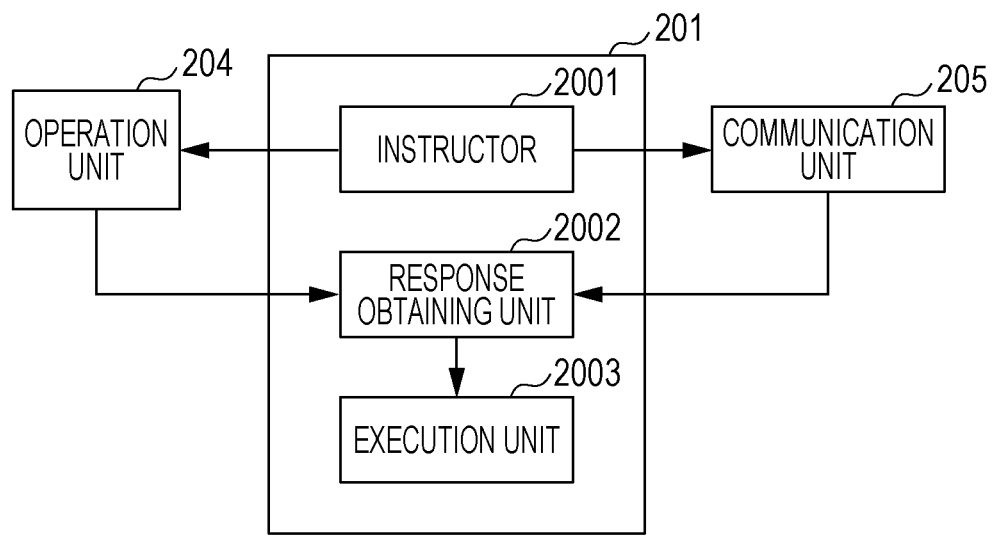
FIG. 5 is a functional block diagram illustrating an example of the functional configuration of the image forming apparatus.

FIG. 5 is a functional block diagram illustrating an example of the functional configuration of the image forming apparatus 20. The functions shown in FIG. 5 are those only related to an exemplary embodiment of the invention among the functions of the image forming apparatus 20.

An instructor 2001, which is an example of an instructor according to an exemplary embodiment of the invention, sends information indicating an approval request screen for making a request to approve the execution of a job of a user to the apparatus of another user, and instructs this apparatus to display the approval request screen. In this case, both users are authenticated and are logged in the image forming apparatus 20. For example, the instructor 2001 sends information indicating an approval request screen for making a request to approve the execution of a job of a user A logged in the image forming apparatus 20 by operating the image forming apparatus 20 to the terminal apparatus 10 of a user B logged in the image forming apparatus 20 by operating the terminal apparatus 10, and instructs the terminal apparatus 10 to display the approval request screen. The instructor 2001 also instructs the image forming apparatus 20 of the user A logged in the image forming apparatus 20 by operating the operation unit 204 to display an approval request screen for making a request to approve the execution of a job of the user B logged in the image forming apparatus 20 by operating the terminal apparatus 10.

A response obtaining unit 2002, which is an example of a response obtaining unit according to an exemplary embodiment of the invention, obtains a response to the above-described approval request screen from a user. An execution unit 2003, which is an example of an execution unit according to an exemplary embodiment of the invention, executes a job in accordance with a response obtained by the response obtaining unit 2002.

(Operation Example of Exemplary Embodiment)

An example of the operation performed in the exemplary embodiment will now be described below. In the following description, it is assumed that the user A operating the image forming apparatus 20 and the user B operating the terminal apparatus 10 are registered as users allowed to set settings of the image forming apparatus 20.

Figure 6:
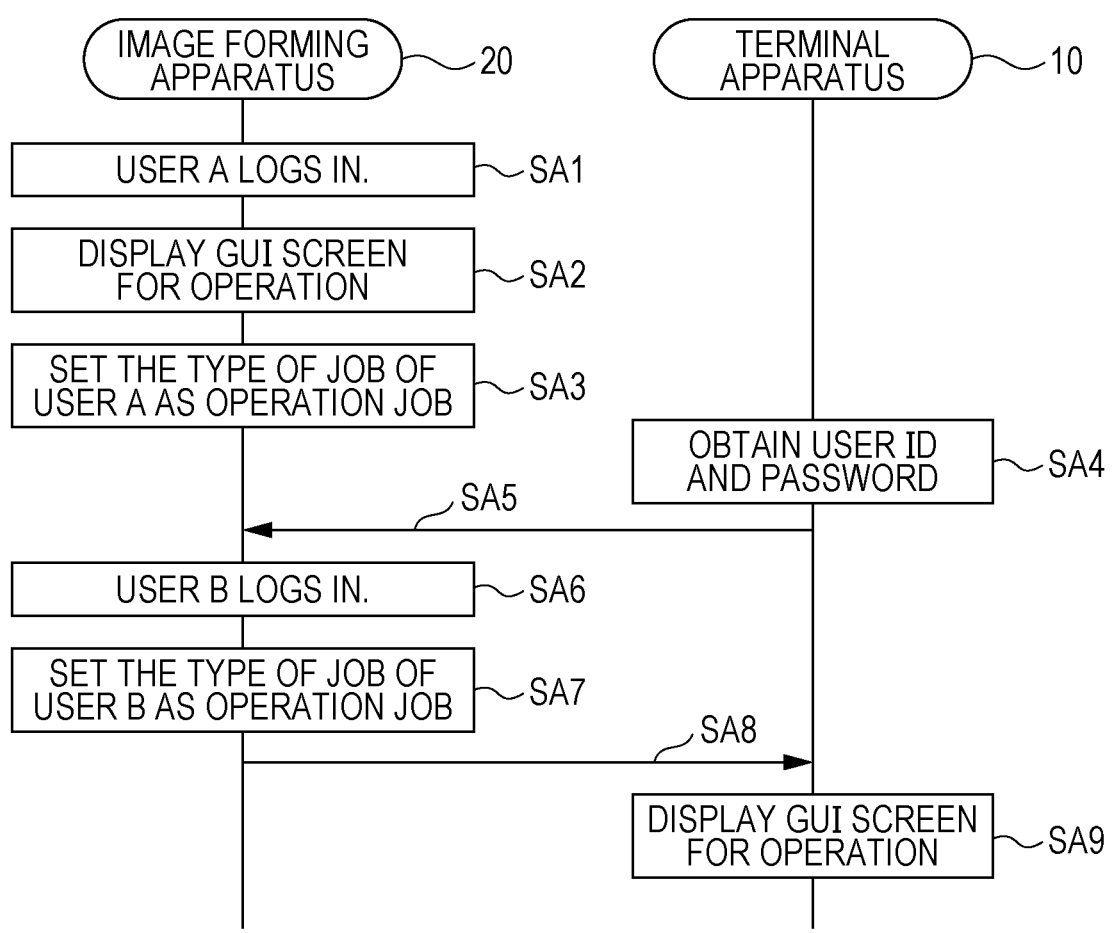
FIG. 6 is a sequence diagram illustrating an operation example.

In step SA1 of FIG. 6, the user A inputs the user ID and the password by using the operation unit 204, and if the same pair of the user ID and the password as that input by the user A is stored in the storage unit 202, the user A is allowed to log in the image forming apparatus 20. The controller 201 is an example of an authenticating unit for authenticating a user. Then, in step SA2, the image forming apparatus 20 displays a GUI screen for operating the image forming apparatus 20 on the touch panel of the operation unit 204. In step SA3, the image forming apparatus 20 sets the type of job of the user A logged in the image forming apparatus 20 as an operation job.

In the terminal apparatus 10, a screen for logging in the image forming apparatus 20 is displayed. In step SA4, the user B inputs the user ID and the password by using the touch panel 103, and then, the terminal apparatus 10 obtains the user ID and the password input by the user. In step SA5, the user B performs a login operation, and the terminal apparatus 10 sends the obtained user ID and password to the image forming apparatus 20.

The image forming apparatus 20 receives the user ID and the password sent in step SA5. If the pair of the user ID and the password as that received by the image forming apparatus 20 is stored in the storage unit 202, the user B is allowed to log in the image forming apparatus 20 in step SA6. In step SA7, the image forming apparatus 20 sets the type of job of the user B as an operation job. In step SA8, the image forming apparatus 20 sends screen information indicating a GUI screen for operating the image forming apparatus 20 to the terminal apparatus 10. The terminal apparatus 10 receives the screen information sent in step SA8. In step SA9, the terminal apparatus 10 displays the GUI screen represented by the screen information on the touch panel 103.

Figure 7A:
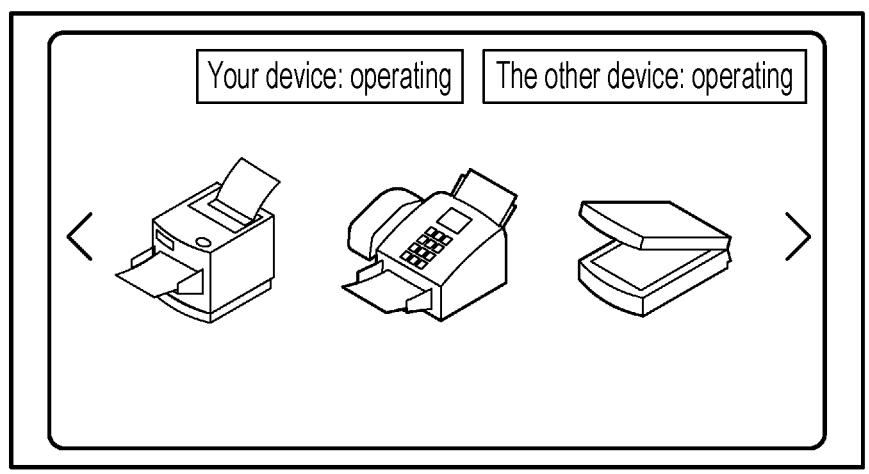
FIGS. 7A and 7B respectively illustrate an example of a graphical user interface (GUI) screen displayed on the image forming apparatus and that on the terminal apparatus.
Figure 7B:
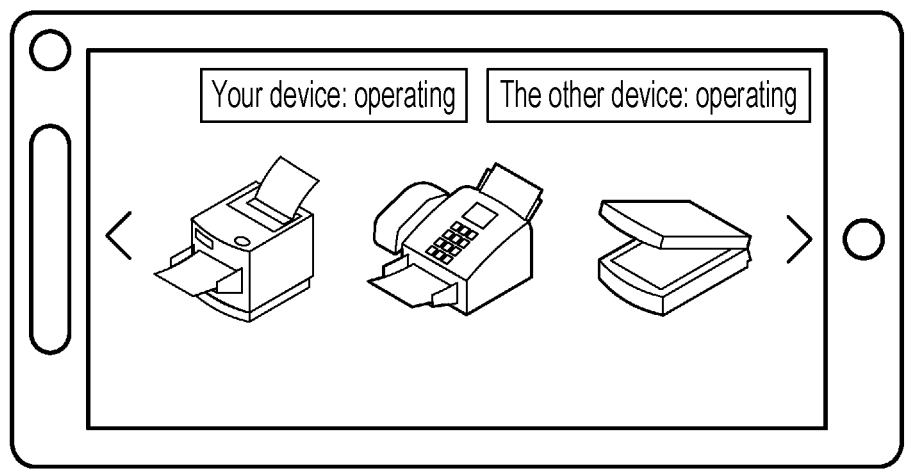

FIG. 7A illustrates an example of the GUI screen displayed on the operation unit 204 in step SA2. FIG. 7B illustrates an example of the GUI screen displayed on the touch panel 103 in step SA9. When the user A and the user B are logging in the image forming apparatus 20, the type of job of the user A and the type of job of the user B are displayed on the top right portion of the GUI screen displayed on the operation unit 204 operated by the user A, as shown in FIG. 7A. In the example shown in FIG. 7A, "Your device: operating" indicates the type of job of the user A, while "The other device: operating" indicates the type of job of the user B. On the GUI screen displayed on the touch panel 103 operated by the user B, information concerning a job of the user A and information concerning a job of the user B are displayed on the top right portion of the GUI screen, as shown in FIG. 7B. In the example shown in FIG. 7B, "Your device: operating" indicates the type of job of the user B, while "The other device: operating" indicates the type of job of the user A.

Figure 8:
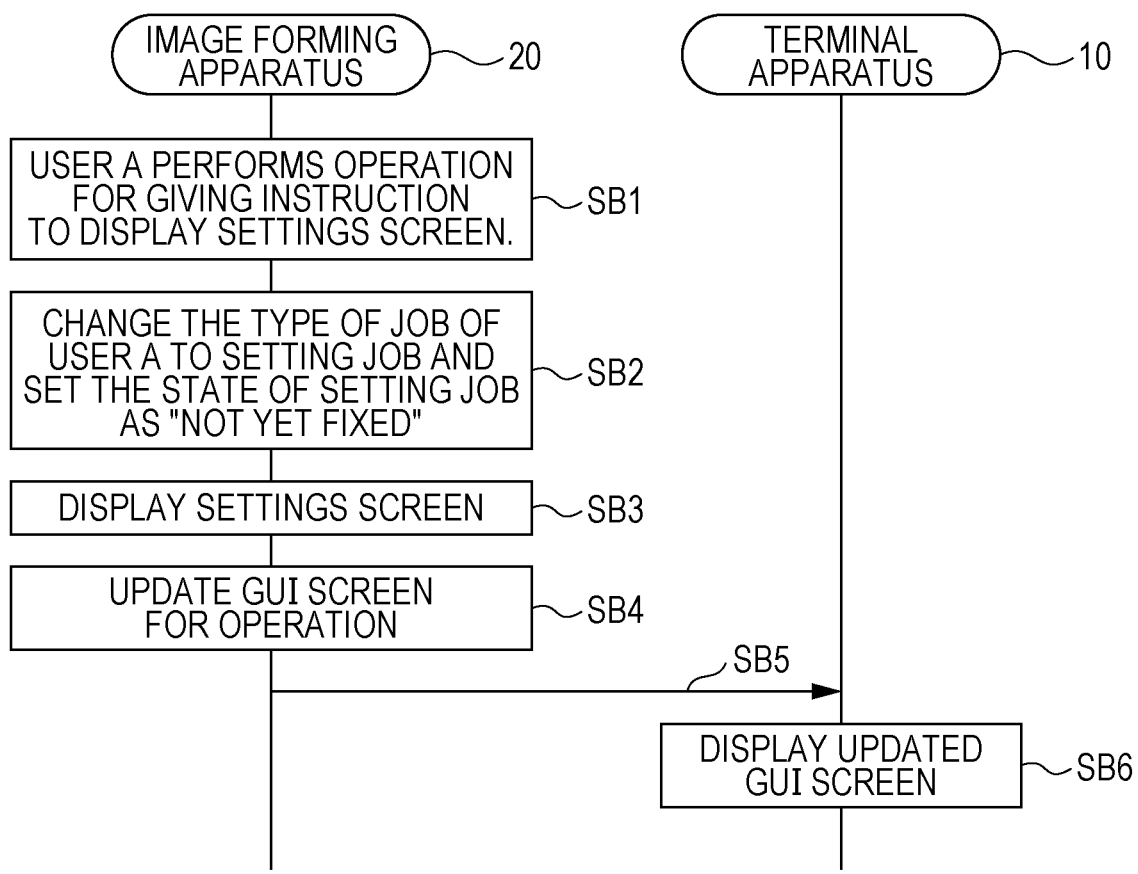
FIG. 8 is a sequence diagram illustrating an operation example.
Figure 9A:
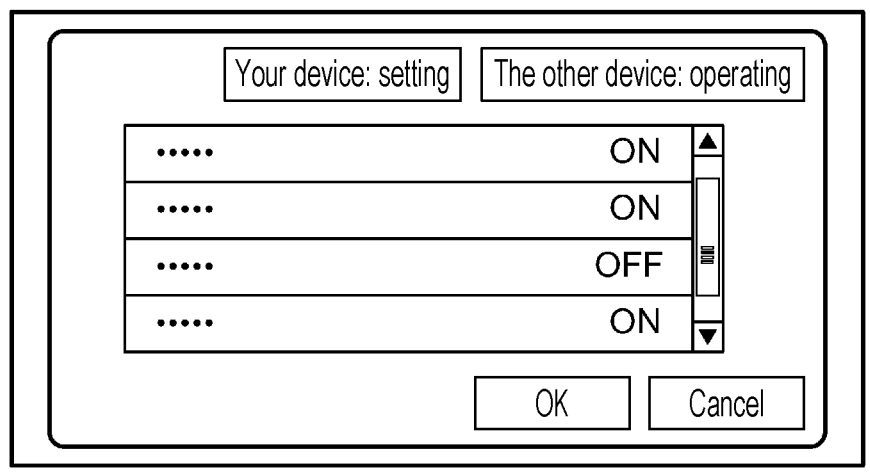
FIGS. 9A and 9B respectively illustrate an example of a screen displayed on the image forming apparatus and that on the terminal apparatus.

Then, in step SB1 of FIG. 8, the user A performs an operation for giving an instruction to display a settings screen on which settings of the image forming apparatus 20 are set. In step SB2, the image forming apparatus 20 changes the type of job of the user A to a setting job and sets the state of the setting job as "not yet fixed". The setting job is an example of setting changing processing of the image forming apparatus 20 according to an exemplary embodiment of the invention. In step SB3, the image forming apparatus 20 displays a settings screen for the image forming apparatus 20 on the operation unit 204. FIG. 9A illustrates an example of the settings screen displayed in step SB3. As shown in FIG. 9A, on the screen displayed on the operation unit 204, the state of the job of the user A is set as "Your device: setting" in accordance with the type of job of the user A.

Figure 9B:
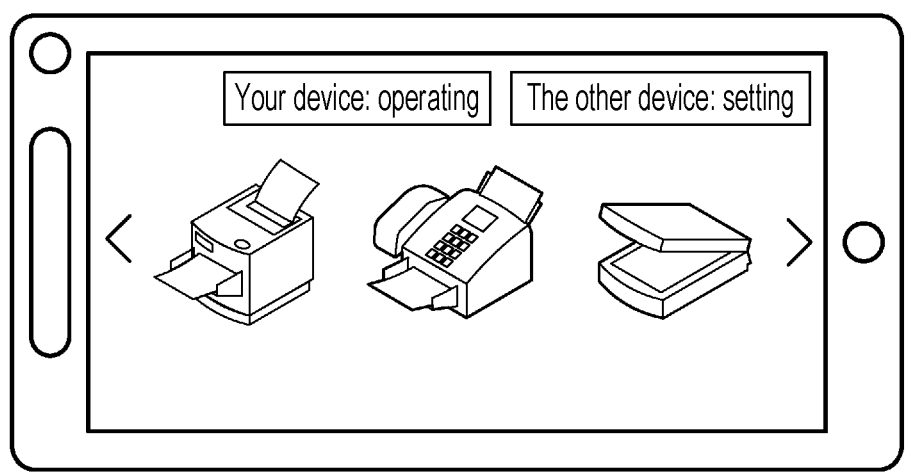

When the job of the user A is set as a setting job (not yet fixed), in step SB4, the image forming apparatus 20 updates the GUI screen for operating the image forming apparatus 20. In step SB5, the image forming apparatus 20 then sends information indicating the updated GUI screen to the terminal apparatus 10. In step SB6, the terminal apparatus 10 receives the information and displays the screen represented by the received information. FIG. 9B illustrates an example of the screen displayed on the touch panel 103 in step SB6. As shown in FIG. 9B, on the touch panel 103, information concerning the job of the user A is updated and is displayed as "The other device: setting". The user B then recognizes that the job of the user A has been updated to the setting job (not yet fixed).

Figure 10:
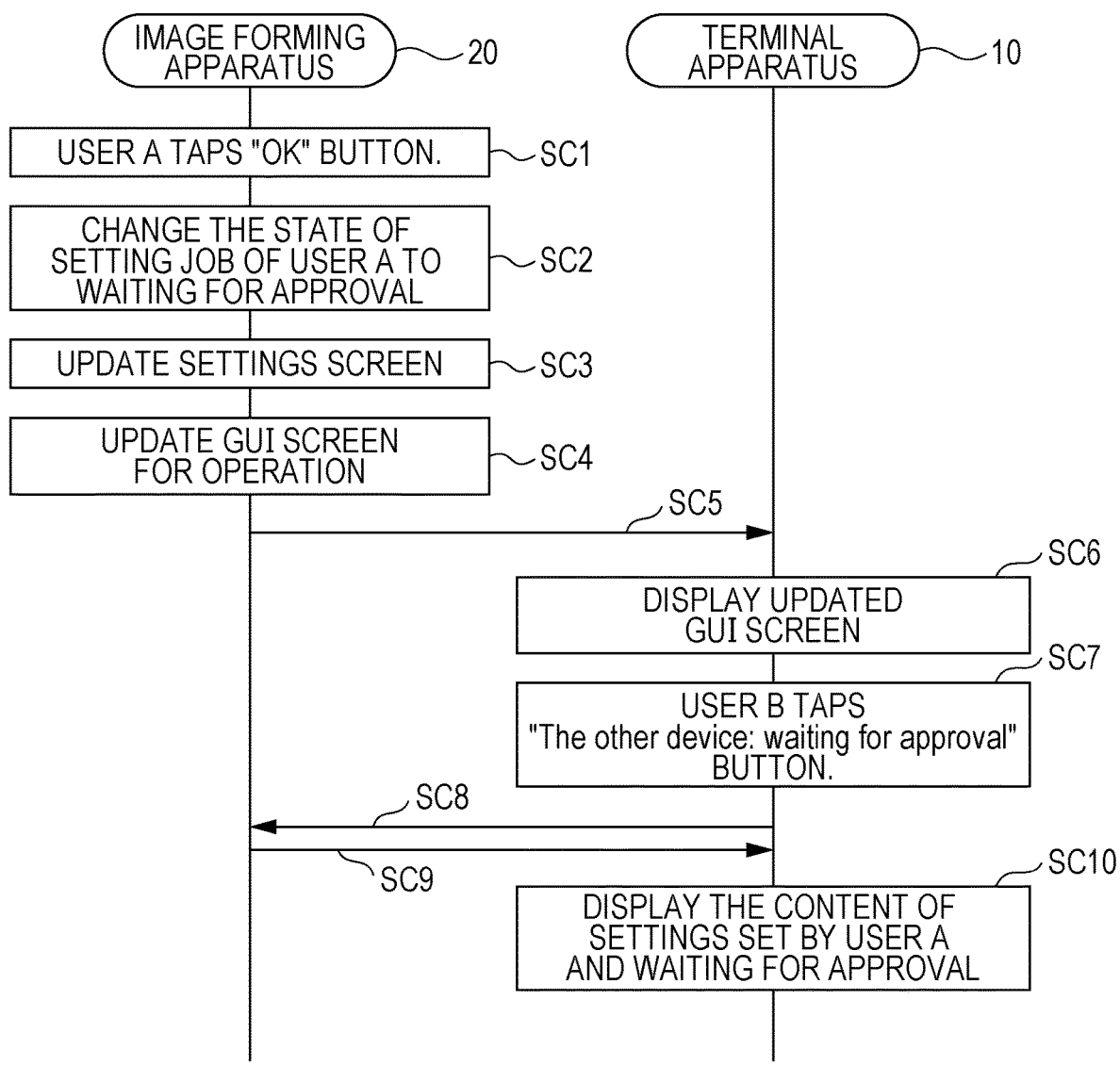
FIG. 10 is a sequence diagram illustrating an operation example.
Figure 11A:
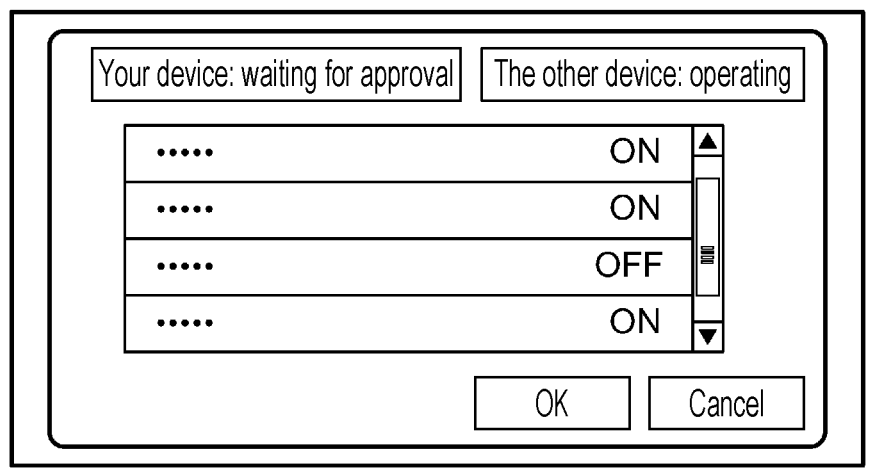
FIGS. 11A and 11B respectively illustrate an example of a screen displayed on the image forming apparatus and that on the terminal apparatus.

The user A sets settings on the settings screen, and then, if the user A wishes to fix the settings, the user A taps an "OK" button shown in FIG. 9A in step SC1 of FIG. 10. When the operation for fixing the settings of the image forming apparatus 20 is performed while multiple users are logging in the image forming apparatus 20, the image forming apparatus 20 changes the state of the setting job of the user A to "waiting for approval" in step SC2. Then, in step SC3, the image forming apparatus 20 updates the settings screen displayed on the operation unit 204, and updates information concerning the job of the user A to "Your device: waiting for approval", as shown in FIG. 11A. While the state of the job is a setting job (waiting for approval), the settings set by the user A have not yet been fixed.

Figure 11B:
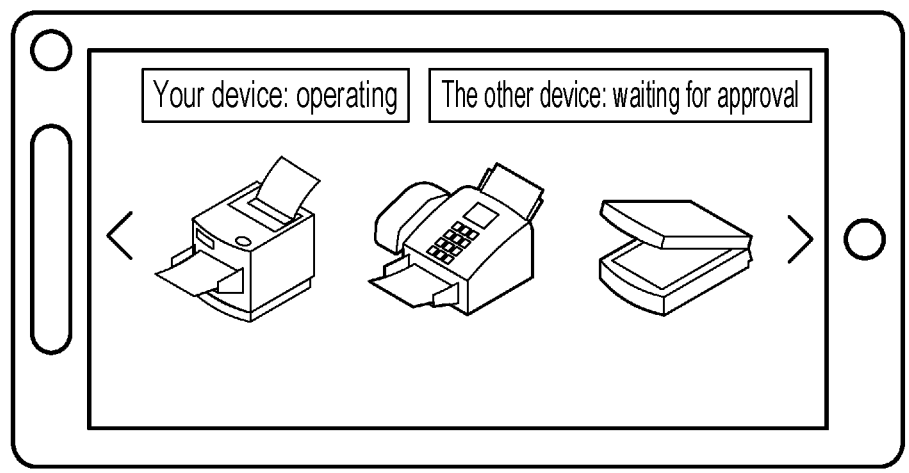

Then, in step SC4, the image forming apparatus 20 updates the GUI screen for operating the image forming apparatus 20. In step SC5, the image forming apparatus 20 sends information indicating the updated GUI screen to the terminal apparatus 10. In step SC6, the terminal apparatus 10 receives the information, and displays the GUI screen represented by the received information. FIG. 11B illustrates an example of the screen displayed on the touch panel 103 in step SC6. As shown in FIG. 11B, on the touch panel 103, information concerning the job of the user A is updated and is displayed as "The other device: waiting for approval. The user B then recognizes that the state of the job of the user A has been updated to the setting job (waiting for approval).

In step SC7, the user B taps a button "The other device: waiting for approval". Then, in step SC8, the terminal apparatus 10 sends a message indicating a request to send information indicating the screen of the content of settings set by the user A to the image forming apparatus 20. Upon receiving this message, in step SC9, the image forming apparatus 20 sends information indicating the screen of the content of settings set by the user A to the terminal apparatus 10, and instructs the terminal apparatus 10 to display this screen.

Figure 12:
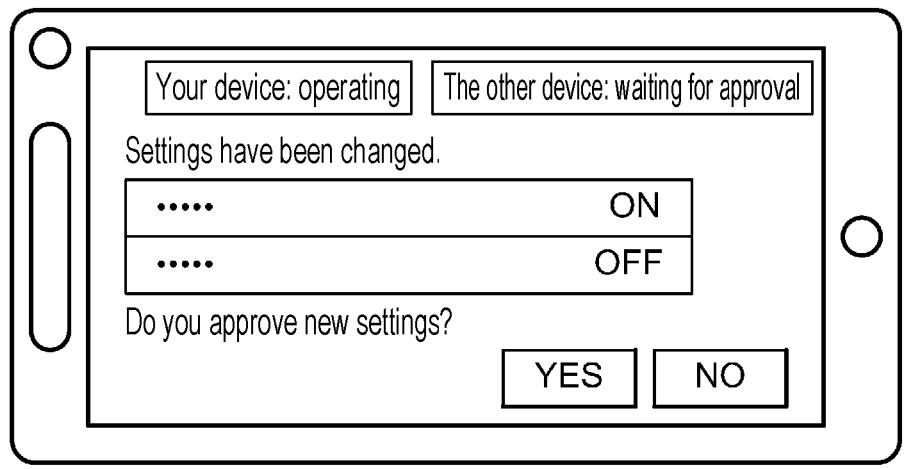
FIG. 12 illustrates an example of a screen displayed on the terminal apparatus.

In step SC10, the display controller 1001 of the terminal apparatus 10 receives the information sent from the image forming apparatus 20 and displays the screen represented by the information. FIG. 12 illustrates an example of the screen displayed on the touch panel 103 in step SC10. The screen shown in FIG. 12 is an example of an approval request screen according to an exemplary embodiment of the invention. As shown in FIG. 12, on the terminal apparatus 10, the content of settings set by the user A, a YES button for approving the settings, and a NO button for rejecting the settings are displayed.

Figure 13:
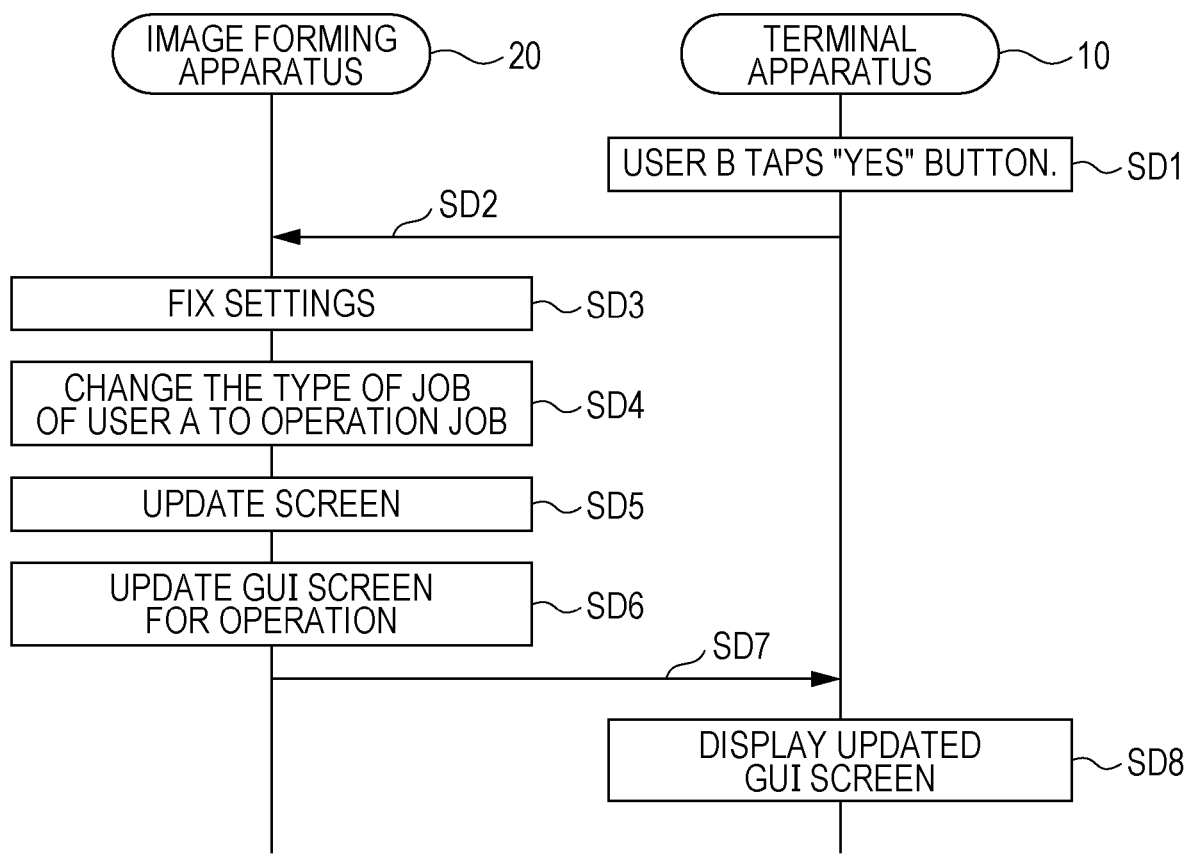
FIG. 13 is a sequence diagram illustrating an operation example.

If the user B taps the YES button on the screen shown in FIG. 12 in step SD1 of FIG. 13, the terminal apparatus 10 receives a response from the user B tapping the YES button and sends a message that the user B has approved of the updated settings to the image forming apparatus 20 in step SD2. Upon receiving this message, in step SD3, the image forming apparatus 20 fixes the settings changed by the user A and waiting for approval. In step SD4, the image forming apparatus 20 changes the type of job of the user A to an operation job. In step SD5, the image forming apparatus 20 updates the screen displayed on the operation unit 204 in accordance with the state of the job of the user A. Then, information concerning the job of the user A on the screen is updated to "Your device: operating".

In step SD6, the image forming apparatus 20 also updates the GUI screen for operating the image forming apparatus 20. In step SD7, the image forming apparatus 20 sends information indicating the updated GUI screen to the terminal apparatus 10. In step SD8, the terminal apparatus 10 receives this information and displays the screen represented by the information. On the screen displayed in step SD8, the type of job of the user A is displayed as "The other device: operating".

Figure 14:
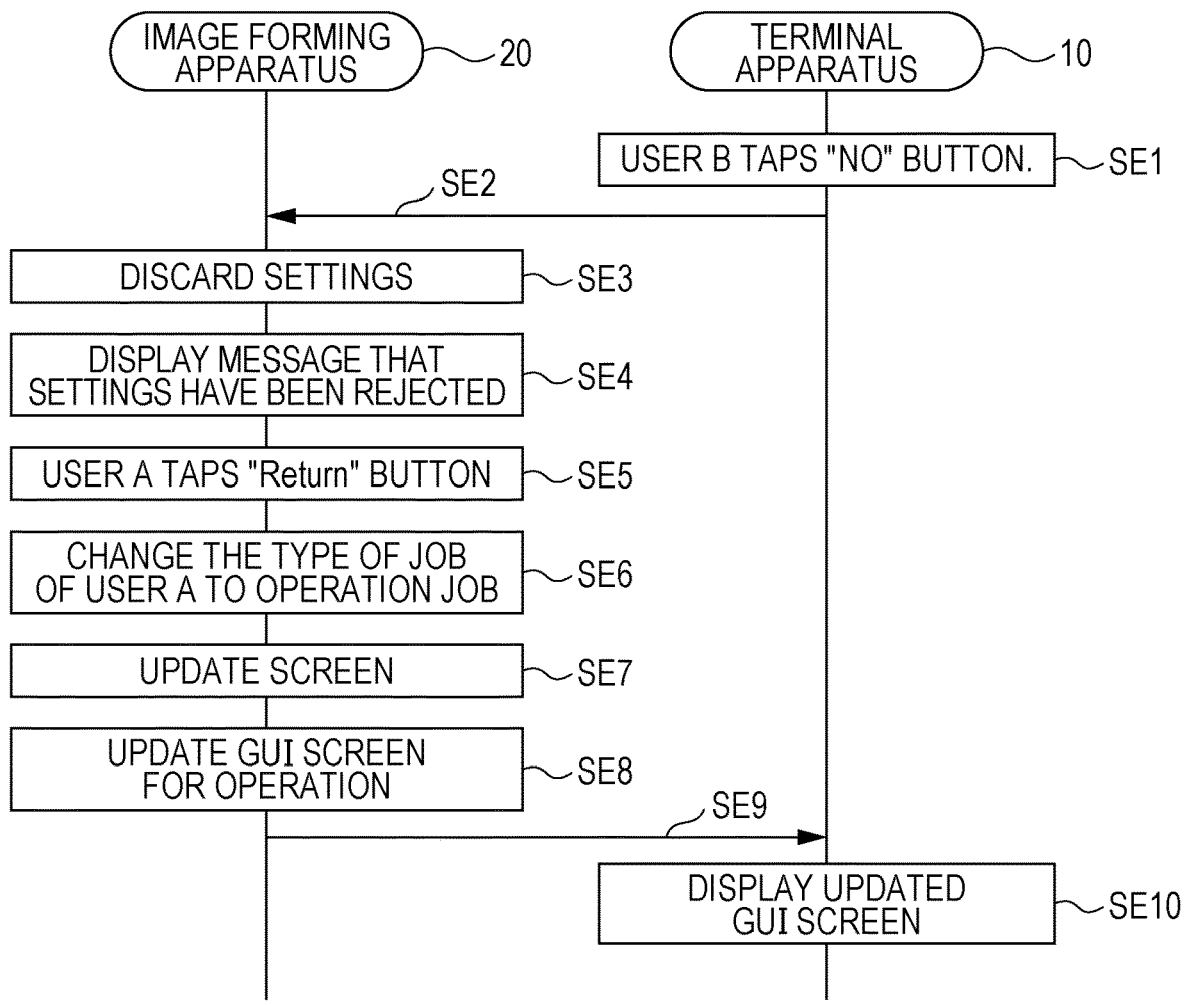
FIG. 14 is a sequence diagram illustrating an operation example.
Figure 15:
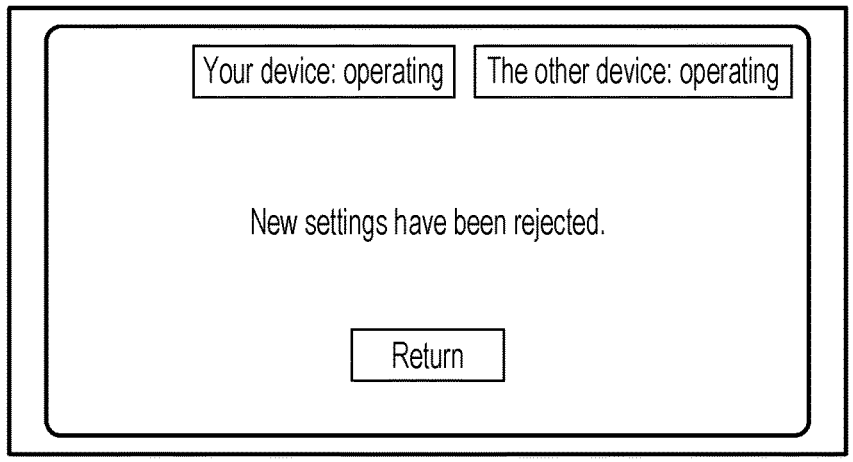
FIG. 15 illustrates an example of a screen displayed on the image forming apparatus.

If the user B taps the NO button on the screen shown in FIG. 12 in step SE1 of FIG. 14, the terminal apparatus 10 sends a message that the user B has rejected the updated settings to the image forming apparatus 20 in step SE2. Upon receiving this message, in step SE3, the image forming apparatus 20 discards the settings set by the user A and waiting for approval. In step SE4, the image forming apparatus 20 then displays a message that the updated settings have been rejected on the operation unit 204. FIG. 15 illustrates an example of the screen displayed in step SE4. If the user taps a "Return" button on the screen shown in FIG. 15 in step SE5, the image forming apparatus 20 changes the type of job of the user A to an operation job in step SE6. In step SE7, the image forming apparatus 20 also updates the screen displayed on the operation unit 204 in accordance with the type of job of the user A. Then, the type of job of the user A is displayed as "Your device: operating".

The image forming apparatus 20 updates the GUI screen for operating the image forming apparatus 20 in step SE8, and sends information indicating the updated GUI screen to the terminal apparatus 10 in step SE9. In step SE10, the terminal apparatus 10 receives this information and displays the screen indicated by the received information. On the screen displayed in step SE10, the job of the user A is displayed as "The other apparatus: operating".

As described above, in this exemplary embodiment, while multiple users are using the image forming apparatus 20, if the settings of the image forming apparatus 20 are updated and if a user other than the user updating the settings approves these settings, the updating of the settings is fixed. If a user other than the user updating the settings rejects these settings, the updating of the settings is not fixed. In this manner, settings set by one user and those by another user do not become contradictory.

MODIFIED EXAMPLES

The exemplary embodiment has been described above. However, the invention is not restricted to the above-described exemplary embodiment and may be carried out in various other modes. The above-described exemplary embodiment may be modified in the following manner, for example. The above-described exemplary embodiment and the following modified examples may be combined with each other.

First Modified Example

In the above-described exemplary embodiment, the operation of the information processing system 1 when two users have logged in the image forming apparatus 20 has been discussed. However, three or more users may log in the image forming apparatus 20 at the same time. In this case, information concerning a job of each user may be displayed. It is assumed, for example, that the type of job of a user A operating the image forming apparatus 20 is an operation job, the type of job of a user B operating a first terminal apparatus 10 is an operation job, and the type of job of a user C operating a second terminal apparatus 10 is a setting job (not yet fixed). In this case, on the screen of each user, information concerning the operation job of the user A, information concerning the operation job of the user B, and information concerning the setting job (not yet fixed) of the user C are displayed.

Second Modified Example

In the above-described exemplary embodiment, when the terminal apparatus 10 displays the screen for operating the image forming apparatus 20, information concerning a job of the user A and information concerning a job of the user B are displayed on this screen. When the terminal apparatus 10 displays a settings screen, information concerning a job of the user A and information concerning a job of the user B may also be displayed on the screens of the image forming apparatus 20 and the terminal apparatus 10.

Third Modified Example

On the screen shown in FIG. 9A, if the user A taps a "Cancel" button to cancel the settings set by the user A, the type of job of the user A may return to an operation job. In this case, the image forming apparatus 20 displays the GUI screen for operating the image forming apparatus 20, and displays the type of job of the user A as "Your device: operating" on the GUI screen, as shown in FIG. 7A. The image forming apparatus 20 also updates the screen to be displayed on the terminal apparatus 10 and sends information indicating the updated screen to the terminal apparatus 10. The terminal apparatus 10 receives this information and displays the updated screen represented by the information. Then, as shown in FIG. 7B, the type of job of the user A is displayed on the touch panel 103 as "The other apparatus: operating".

Fourth Modified Example

When the type of job of the user A is changed to a setting job (waiting for approval), if the types of jobs of the other users are all operation jobs, the image forming apparatus 20 may fix the settings changed by the user A without asking the other users for approval. In this case, the image forming apparatus 20 may send information indicating the screen of the content of the updated settings to the terminal apparatuses 10 of the other users, and the terminal apparatuses 10 may display the screen represented by the information. Then, the other users understand the content of the settings changed by the user A.

Fifth Modified Example

When the user B taps the "NO" button on the screen shown in FIG. 12, the image forming apparatus 20 and the terminal apparatus 10 may start chat communication. The user A is then able to ask the user B via chat why the user B has rejected the updating of settings. Chat communication is not restricted to text chat, and may be voice chat.

Sixth Modified Example

There may be a situation where the image forming apparatus 20 is required to restart when a certain setting is fixed. It is assumed, for example, that the user B is changing the settings of the image forming apparatus 20 and the type of job of the user B is a setting job (not yet fixed). In this case, if the image forming apparatus 20 fixes a setting changed by the user A which requires the restarting of the image forming apparatus 20, information concerning the setting job of the user B may be stored in the storage unit 202 before restarting the image forming apparatus 20. Then, when the user B logs in after the image forming apparatus 20 has restarted, the information stored in the storage unit 202 may be reconstructed. In the sixth modified example, the controller 201 is an example of a reconstructing unit according to an exemplary embodiment of the invention. When the image forming apparatus 20 has reconstructed the information stored in the storage unit 202, the settings screen displayed on the terminal apparatus 10 before the image forming apparatus 20 is restarted is displayed on the touch panel 103, and the user B is able to restart changing settings, which has been interrupted by the restarting of the image forming apparatus 20.

Seventh Modified Example

The time (execution time) at which the updating of settings of the image forming apparatus 20 will be executed may be set. This configuration makes it possible to execute the updating of settings approved by a user logging in the image forming apparatus 20 at the time specified by a user changed the settings.

Eighth Modified Example

When displaying information concerning a job of a user logging in the image forming apparatus 20, the color of the background of characters representing the information concerning a job may vary according to the state of the job. For example, when the type of job of a user logging in the image forming apparatus 20 is an operation job, the background of the characters "Your device: operating" and "The other device: operating" shown in FIGS. 7A and 7B may be displayed in blue. When the type of job of a user logging in the image forming apparatus 20 is a setting job (not yet fixed), the background of the characters "Your device: setting" shown in FIG. 9A and "The other device: setting" shown in FIG. 9B may be displayed in blue. When the type of job of a user logging in the image forming apparatus 20 is a setting job (waiting for approval), the background of the characters "Your device: waiting for approval" shown in FIG. 11A and "The other device: waiting for approval" shown in FIG. 11B may be displayed in red. If the time at which the updating of settings will be executed is set, concerning a setting job approved by a user and waiting to be executed, the type of this job may be displayed as "Setting (waiting to be executed)" and the background of these characters may be displayed in yellow.

Ninth Modified Example

In the above-described exemplary embodiment, when the user B taps the button "The other device: waiting for approval", the terminal apparatus 10 displays the screen indicating the content of the job of the user A waiting for approval. On this screen, the state of the previous setting and the state of the updated setting may be displayed. For example, if the font of characters displayed on the touch panel of the operation unit 204 is changed, the previous font and the updated font may be displayed. In the ninth modified example, the state of the previous settings and that of the updated settings may also be displayed concerning the language and the background and the design of the screen displayed on the operation unit 204.

Tenth Modified Example

The screens on which settings of the image forming apparatus 20 are set may be formed in a hierarchical structure. For example, on the screen on which a setting concerning whether to conduct user authentication is set, if a user has selected a setting in which user authentication is not conducted, the GUI button for shifting to the screen on which a user ID and a password of a user are set is grayed out. If the user has selected a setting in which user authentication is conducted, the graying out of the GUI button for shifting to the screen on which a user ID and a password of a user are set is canceled. When the user taps this GUI button, the image forming apparatus 20 displays a screen on which a user ID and a password of a user are set. The setting concerning whether to conduct user authentication and the setting of a user ID and a password are related to each other. The hierarchical level of the screen on which the setting concerning whether to conduct user authentication is set is higher than that of the screen on which a user ID and a password are set.

In the above-described hierarchical configuration of the tenth modified example, it is now assumed that, while the user B is setting a user ID and a password by using the terminal apparatus 10, the user A has changed the setting concerning whether to conduct user authentication to the setting in which user authentication is not conducted by using the image forming apparatus 20. When the user A fixes the setting in which user authentication is not conducted, the image forming apparatus 20 specifies a user setting a setting on the screen higher and/or lower than the screen on which the setting concerning whether to conduct user authentication is set. In this case, the image forming apparatus 20 specifies the user B setting a user ID and a password. The image forming apparatus 20 then displays the setting item set by the user A and the setting item set by the user B on the operation unit 204, and informs the user A of the setting item which will be influenced by the setting set by the user A. The image forming apparatus 20 also sends information concerning the screen on which the setting item set by the user A and the setting item set by the user B are displayed to the terminal apparatus 10 of the user B. The terminal apparatus 10 displays the screen represented by the information sent from the image forming apparatus 20 so as to inform the user B that the user A has set a setting which will influence the setting set by the user B.

Eleventh Modified Example

In the above-described exemplary embodiment, the image forming apparatus 20 conducts user authentication by using a user ID and a password stored in the storage unit 202. Alternatively, an authentication server connected to the image forming apparatus 20 via the communication network 2 may conduct authentication for a user using the image forming apparatus 20.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor programmed to function as:
an instructing unit that provides an instruction to display an approval request screen to a terminal apparatus operated by a second user authenticated to a system, the approval request screen being used for making a request to approve execution of setting changing processing for changing a setting of the information processing apparatus proposed by a first user other than the second user, the first user also being authenticated to the system, the first user being a user of the information processing apparatus;
a response obtaining unit that obtains a response from the second user that is made on the approval request screen; and
an execution unit that executes the setting changing processing in accordance with the response obtained by the response obtaining unit.

2. The information processing apparatus according to claim 1, wherein the execution unit executes the setting changing processing if the response obtained by the response obtaining unit indicates that the second user has approved the execution of the setting changing processing.

3. The information processing apparatus according to claim 2, wherein:
an execution time is set for executing the setting changing processing; and
the execution unit executes the setting changing processing at the execution time.

4. The information processing apparatus according to claim 1, wherein the execution unit does not execute the setting changing processing if the response obtained by the response obtaining unit indicates that the second user has rejected the execution of the setting changing processing.

5. The information processing apparatus according to claim 4, wherein, if the response obtained by the response obtaining unit indicates that the second user has rejected the execution of the setting changing processing, an instruction to start voice or text communication between the information processing apparatus operated by the first user and the terminal apparatus operated by the second user is provided to the information processing apparatus.

6. The information processing apparatus according to claim 1, wherein, if a setting item to be changed by the setting changing processing by the first user and a setting item to be changed by the setting changing processing by the second user are related to each other, the instructing unit instructs the terminal apparatus operated by the second user to display a screen indicating the setting item related to each other.

7. The information processing apparatus according to claim 1, further comprising:
a memory that stores the setting changing processing concerning the second user if the setting changing processing concerning the second user has not yet been executed when restarting the information processing apparatus after the execution unit has executed the setting changing processing concerning the first user, wherein
the processor is further configured to function as a reconstructing unit that reconstructs the setting changing processing concerning the second user stored in the memory if the second user is authenticated after the information processing apparatus is restarted.

8. The information processing apparatus according to claim 1, wherein when a plurality of users are logged into the information processing apparatus, the information processing apparatus displays a state of the setting as waiting for approval on a display screen for the first user until the second user operates the terminal apparatus operated by the second user.

9. The information processing apparatus according to claim 8, wherein when the second user approves a change of the state of the setting, the information processing apparatus updates the state of the setting to display as operating on the display screen.

10. A non-transitory computer readable medium storing a program causing a computer to execute a process, the process comprising:
providing an instruction to display an approval request screen to a terminal apparatus operated by a second user authenticated to a system, the approval request screen being used for making a request to approve execution of setting changing processing for changing a setting of an information processing apparatus proposed by a first user other than the second user, the first user being a user of the information processing apparatus, the first user also being authenticated to the system;

obtaining a response from the second user that is made on the approval request screen; and executing the setting changing processing in accordance with the obtained response.

11. An information processing system comprising:

an information processing apparatus; and a terminal apparatus, the information processing apparatus including a processor programmed to function as:

an instructing unit that provides an instruction to display an approval request screen to the terminal apparatus operated by a second user authenticated to the system, the approval request screen being used for making a request to approve execution of setting changing processing for changing a setting of the information processing apparatus operated by a first user other than the second user, the first user also being authenticated to the system, the first user being a user of the information processing apparatus, a response obtaining unit that obtains a response from the second user that is made on the approval request screen, and an execution unit that executes the setting changing processing in accordance with the response obtained by the response obtaining unit, the terminal apparatus including a display that displays the approval request screen in accordance with the instruction from the instructing unit; and a processor configured to function as:

a receiver that receives a response made on the approval request screen displayed by the display from the second user, and a sender that sends the response received by the receiver to the information processing apparatus.

* * * * *